United States Patent
Yu

(10) Patent No.: US 10,831,063 B2
(45) Date of Patent: Nov. 10, 2020

(54) ILLUMINANT ASSEMBLY AND BACKLIGHT UNIT USING THE SAME

(71) Applicant: Wuhan China Star Optoelectronics Technology Co., Ltd., Wuhan (CN)

(72) Inventor: Pengfei Yu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/470,675

(22) PCT Filed: Mar. 25, 2019

(86) PCT No.: PCT/CN2019/079487
§ 371 (c)(1),
(2) Date: Jun. 18, 2019

(87) PCT Pub. No.: WO2020/107755
PCT Pub. Date: Jun. 4, 2020

(65) Prior Publication Data
US 2020/0192161 A1    Jun. 18, 2020

(30) Foreign Application Priority Data

Nov. 30, 2018    (CN) .......................... 2018 1 1449363

(51) Int. Cl.
*G02F 1/13357*    (2006.01)

(52) U.S. Cl.
CPC .. *G02F 1/133609* (2013.01); *G02F 1/133603* (2013.01)

(58) Field of Classification Search
None
See application file for complete search history.

(56) References Cited

U.S. PATENT DOCUMENTS

2008/0304262 A1 * 12/2008 Takenaka ............... G03B 15/03
362/231

FOREIGN PATENT DOCUMENTS

| CN | 101262033 | 9/2008 |
| CN | 102095093 | 6/2011 |
| CN | 102278641 | 12/2011 |
| CN | 102913784 | 2/2013 |
| CN | 103617993 | 3/2014 |
| JP | 2007080864 A * | 3/2007 |
| JP | 2014-232826 | 12/2014 |

* cited by examiner

*Primary Examiner* — Vip Patel

(57) ABSTRACT

An illuminant assembly includes a substrate, blue-ray chips, red-ray chips, and a green fluorescent material layer. The blue-ray chips are disposed on the substrate. The red-ray chips are intertwined with the blue-ray chips on the substrate. The green fluorescent material layer covers at least surfaces of the blue-ray chips and the red-ray chips.

6 Claims, 2 Drawing Sheets

US 10,831,063 B2

ILLUMINANT ASSEMBLY AND BACKLIGHT UNIT USING THE SAME

RELATED APPLICATIONS

This application is a National Phase of PCT Patent Application No. PCT/CN2019/079487 having International filing date of Mar. 25, 2019, which claims the benefit of priority of Chinese Patent Application No. 201811449363.8 filed on Nov. 30, 2018. The contents of the above applications are all incorporated by reference as if fully set forth herein in their entirety.

FIELD AND BACKGROUND OF THE INVENTION

The present disclosure relates to the field of backlight technology, and more particularly, to an illuminant assembly and a backlight unit.

In current display devices, backlight units (BLUs) which emit white light are usually used to enrich displaying pictures. Currently, white light-emitting diodes are commonly used as illuminants of backlight units. However, a white light-emitting diode is composed of a blue light-emitting diode, a red light-emitting diode, and a green light-emitting diode, so it has rather high cost and more energy consumption. Further, the purity of white light of current backlight units can not fully satisfy demand of consumers yet.

Therefore, it is necessary to provide an illuminant assembly and a backlight unit to solve the above problems.

SUMMARY OF THE INVENTION

A technical problem is that, a white light-emitting diode is composed of a blue light-emitting diode, a red light-emitting diode, and a green light-emitting diode, so it has rather high cost and more energy consumption. Further, the purity of white light of current backlight units can not fully satisfy demand of consumers yet.

The object of the present disclosure is to provide an illuminant assembly and a backlight unit to increase the purity of white light of backlight units and thus enhance effects of displaying of display devices.

In order to realize the above object, the present disclosure provides an illuminant assembly, including: a substrate; a plurality of blue-ray chips disposed on the substrate; a plurality of red-ray chips intertwined with the plurality of blue-ray chips on the substrate; and a green fluorescent material layer which covers at least surfaces of the plurality of blue-ray chips and the plurality of red-ray chips; wherein: each of the plurality of blue-ray chips is arranged at an equal interval from each of the plurality of red-ray chips and on the substrate; and the green fluorescent material layer is formed on the surfaces of the plurality of blue-ray chips and the plurality of red-ray chips through a coating method.

In order to realize the above object, the present disclosure provides an illuminant assembly, including: a substrate; a plurality of blue-ray chips disposed on the substrate; a plurality of red-ray chips intertwined with the plurality of blue-ray chips on the substrate; and a green fluorescent material layer which covers at least surfaces of the plurality of blue-ray chips and the plurality of red-ray chips.

In some embodiments, the green fluorescent material layer is formed on the surfaces of the plurality of blue-ray chips and the plurality of red-ray chips through a coating method.

In some embodiments, the green fluorescent material layer is green fluorescent powder.

In some embodiments, each of the plurality of blue-ray chips is arranged at an equal interval from each of the plurality of red-ray chips and on the substrate.

In some embodiments, the blue-ray chips are blue light-emitting diodes.

In some embodiments, the red-ray chips are red light-emitting diodes.

In order to realize the above object, the present disclosure provides a backlight unit, including: an illuminant assembly, wherein the illuminant assembly includes: a substrate; a plurality of blue-ray chips disposed on the substrate; a plurality of red-ray chips intertwined with the plurality of blue-ray chips on the substrate; and a green fluorescent material layer which covers at least surfaces of the plurality of blue-ray chips and the plurality of red-ray chips.

In some embodiments, the green fluorescent material layer is formed on the surfaces of the plurality of blue-ray chips and the plurality of red-ray chips through a coating method.

In some embodiments, the green fluorescent material layer is green fluorescent powder.

In some embodiments, each of the plurality of blue-ray chips is arranged at an equal interval from each of the plurality of red-ray chips and on the substrate.

The beneficial effect of the present disclosure is that, the purity of white light of backlight units can be increased, and thus effects of displaying of display devices are enhanced.

BRIEF DESCRIPTION OF THE SEVERAL VIEWS OF THE DRAWINGS

To ensure the features and the technical content of the disclosure are more apparent and easier to understand, please refer to the explanation and the accompanying drawings of the disclosure as follows. However, the accompanying drawings are merely for reference without limiting the disclosure.

DESCRIPTION OF SPECIFIC EMBODIMENTS OF THE INVENTION

To ensure the objects, the technical solutions, and the effects of the disclosure are clearer and more specific, the disclosure will be explained in conjunction with the accompanying drawings in detail further below. It should be understood that the embodiments described herein are merely a part of the embodiments of the present disclosure instead of all of the embodiments and not used to limit the disclosure.

Figure 1:
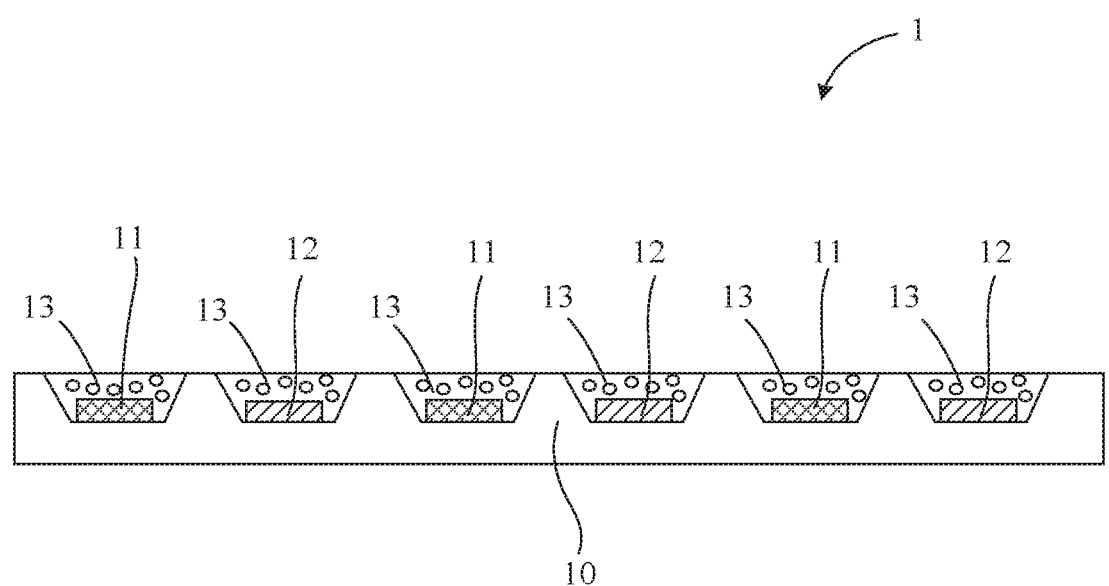
FIG. 1 is a schematic structural diagram of an illuminant assembly according to an embodiment of the present disclosure.

Please refer to FIG. 1, which is a schematic structural diagram of an illuminant assembly 1 according to an embodiment of the present disclosure. The illuminant assembly 1 includes a substrate 10, a plurality of blue-ray chips 11, a plurality of red-ray chips 12, and a green fluorescent material layer 13. The plurality of blue-ray chips 11 are disposed on the substrate 10. Specifically, the blue-ray chips 11 are blue light-emitting diodes.

The plurality of red-ray chips 12 are intertwined with the plurality of blue-ray chips 11 on the substrate 10. Specifically, the red-ray chips 12 are red light-emitting diodes. As shown in FIG. 1, in an embodiment of the present disclosure, each of the blue-ray chips 11 is arranged at an equal interval from each of the red-ray chips 12 and on the substrate 10 so that a light bar is formed.

Continuing to refer to FIG. 1, the green fluorescent material layer 13 covers at least surfaces of the plurality of blue-ray chips 11 and the plurality of red-ray chips 12. Specifically, the green fluorescent material layer 13 is green fluorescent powder. Further, the green fluorescent material layer 13 is formed on the surfaces of the plurality of blue-ray chips 11 and the plurality of red-ray chips 12 through a coating method.

Figure 2:
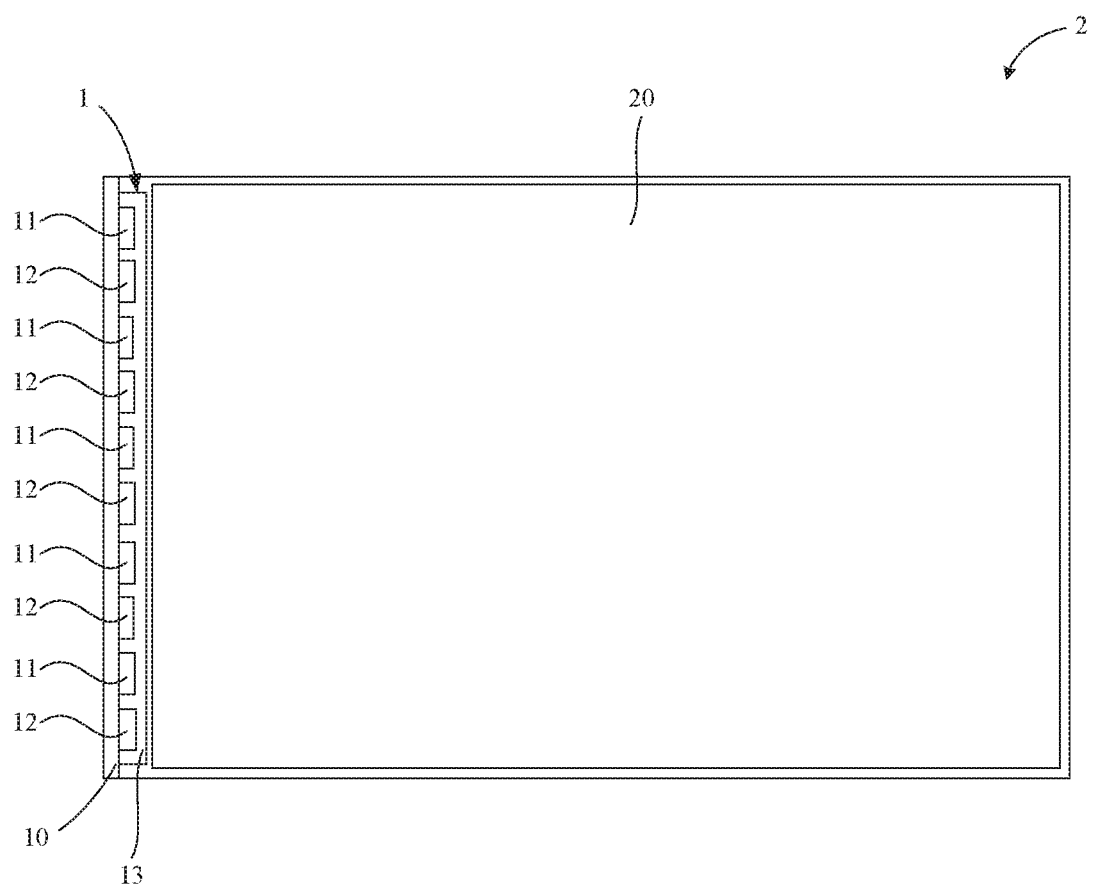
FIG. 2 is a top view of structure of a backlight unit according to an embodiment of the present disclosure.

Please refer to FIG. 2, which is a top view of structure of a backlight unit 2 according to an embodiment of the present disclosure. For the convenience of explaining, part of components of the backlight unit 2 are omitted. As shown in FIG. 2, the backlight unit 2 includes an illuminant assembly 1 and a light guide plate 20. In the embodiment shown in FIG. 2, backlight unit 2 is, but not limited to, an edge-lit backlight unit. Also, backlight unit 2 can be a direct-lit backlight unit or any other type of backlight unit.

As shown in FIG. 2, the illuminant assembly 1 includes a substrate 10, a plurality of blue-ray chips 11, a plurality of red-ray chips 12, and a green fluorescent material layer 13. The plurality of blue-ray chips 11 are disposed on the substrate 10. Specifically, the blue-ray chips 11 are blue light-emitting diodes.

The plurality of red-ray chips 12 are intertwined with the plurality of blue-ray chips 11 on the substrate 10. Specifically, the red-ray chips 12 are red light-emitting diodes. As shown in FIG. 2, in an embodiment of the present disclosure, each of the blue-ray chips 11 is arranged at an equal interval from each of the red-ray chips 12 and on the substrate 10 so that a light bar is formed.

Continuing to refer to FIG. 2, the green fluorescent material layer 13 covers at least surfaces of the plurality of blue-ray chips 11 and the plurality of red-ray chips 12. Specifically, the green fluorescent material layer 13 is green fluorescent powder. Further, the green fluorescent material layer 13 is formed on the surfaces of the plurality of blue-ray chips 11 and the plurality of red-ray chips 12 through a coating method.

When being triggered, the blue-ray chips 11 and the red-ray chips 12 emit blue light and red light with specific wavelengths respectively. Then, the green fluorescent material layer 13 is triggered by the blue light and the red light to emit green light. Last, the blue light, the red light, and the green light are mixed to form pure white light. As shown in FIG. 2, a light bar composed of the blue-ray chips 11, the red-ray chips 12, and the green fluorescent material layer 13 can increase the purity of white light of the backlight unit 2 and enhance effects of displaying of display devices.

In conclusion, an illuminant assembly and a backlight unit, provided in the present disclosure, generate white light through combining blue-ray chips, red-ray chips, and a green fluorescent material layer so that the purity of white light of backlight units can be increased, and effects of displaying of display devices are enhanced.

It should be understood that the application of the present disclosure is not limited by the foregoing examples. A person of ordinary skill in the art is able to make modifications or changes based on the foregoing description, and all of these modifications and changes are within the scope of the appended claims of the present disclosure.

The industrial applicability of the present disclosure is that, an illuminant assembly and a backlight unit, provided in the present disclosure, generate white light through combining blue-ray chips, red-ray chips, and a green fluorescent material layer so that the purity of white light of backlight units can be increased, and effects of displaying of display devices are enhanced.

What is claimed is:

1. An illuminant assembly, comprising:
   a substrate;
   a plurality of blue-ray chips disposed on the substrate;
   a plurality of red-ray chips disposed on the substrate and intertwined with the plurality of blue-ray chips; and
   a green fluorescent material layer which covers at least surfaces of the plurality of blue-ray chips and the plurality of red-ray chips;
   wherein each of the plurality of blue-ray chips is arranged at an equal interval from each of the plurality of red-ray chips.

2. The illuminant assembly according to claim 1, wherein the green fluorescent material layer is green fluorescent powder.

3. The illuminant assembly according to claim 1, wherein the blue-ray chips are blue light-emitting diodes.

4. The illuminant assembly according to claim 1, wherein the red-ray chips are red light-emitting diodes.

5. A backlight unit, comprising: an illuminant assembly, wherein the illuminant assembly comprises:
   a substrate;
   a plurality of blue-ray chips disposed on the substrate;
   plurality of red-ray chips disposed on the substrate and intertwined with the plurality of blue-ray chips; and
   a green fluorescent material layer which covers at least surfaces of the plurality of blue-ray chips and the plurality of red-ray chips;
   wherein each of the plurality of blue-ray chips is arranged at an equal interval from each of the plurality of red-ray chips.

6. The backlight unit according to claim 5, wherein the green fluorescent material layer is green fluorescent powder.

* * * * *